United States Patent [19]

Hakuraku et al.

[11] Patent Number: 4,532,770
[45] Date of Patent: Aug. 6, 1985

[54] MAGNETIC REFRIGERATOR

[75] Inventors: Yoshinori Hakuraku; Hisanao Ogata; Takahiro Daikoku, all of Ibaraki; Noboru Suzuki, Hitachi, all of Japan

[73] Assignee: Hitachi, Ltd., Tokyo, Japan

[21] Appl. No.: 625,241

[22] Filed: Jun. 27, 1984

[30] Foreign Application Priority Data

Jun. 29, 1983 [JP] Japan ............... 58-115818

[51] Int. Cl.³ .................................. F25B 21/02
[52] U.S. Cl. ................................................ 62/3
[58] Field of Search ................................. 62/3

[56] References Cited

U.S. PATENT DOCUMENTS

4,033,734  7/1977  Steyert, Jr. et al. ............ 62/3
4,107,935  8/1978  Steyert, Jr. ...................... 62/3
4,332,135  6/1982  Barclay et al. .................. 62/3
4,459,811  7/1984  Barclay et al. .................. 62/3

Primary Examiner—Lloyd L. King
Attorney, Agent, or Firm—Antonelli, Terry & Wands

[57] ABSTRACT

In a magnetic refrigerator comprising working substances for the magnetic refrigeration and a magnetic field generating device which magnetizes and demagnetizes these working substances, this magnetic refrigerator is provided with a plurality of superconducting coils arranged around the outer periphery of a rotor, a plurality of working substances are arranged around the periphery of said rotor, and the rotor is rotated so that the strength of magnetic fields impressed on the working substances is varied.

4 Claims, 13 Drawing Figures

MAGNETIC REFRIGERATOR

BACKGROUND OF THE INVENTION

1. Field of the Invention

The present invention relates to a magnetic refrigerator comprising working substances for the magnetic refrigeration and a magnetic field generating device which can vary the distribution or strength of magnetic fields applied to the working substances, and it relates in particular to a magnetic refrigerator which is suitable for providing highly efficient refrigeration.

2. Description of the Prior Art

A magnetic refrigerator known heretofore is of the reciprocating type, as disclosed in the specification of U.S. Pat. No. 4,332,135. This reciprocating type of refrigerator wherein a working substance is moved into and out of a high magnetic field by a reciprocating motion requires a complicated mechanism for driving the working substance and a large structure for the entire refrigerator. A rotary type of magnetic refrigerator, as disclosed in the specification of U.S. Pat. No. 4,107,935, which rotates the working substance, is known as well, but the refrigerator of this type has an inevitable problem concerning the fluidtightness since a heat-exchanging medium flows through a rotating body, and requires a very complicated construction since means for circulating the fluid, etc., are required.

SUMMARY OF THE INVENTION

An object of the present invention is to furnish a highly efficient magnetic refrigerator of a stationary type, which enables the solution of these problems.

According to the present invention, a refrigeration cycle is formed by varying periodically the distribution or strength of magnetic fields applied to working substances of the magnetic refrigerator, which are set in fixed positions.

DESCRIPTION OF THE PREFERRED EMBODIMENTS

Figure 1:
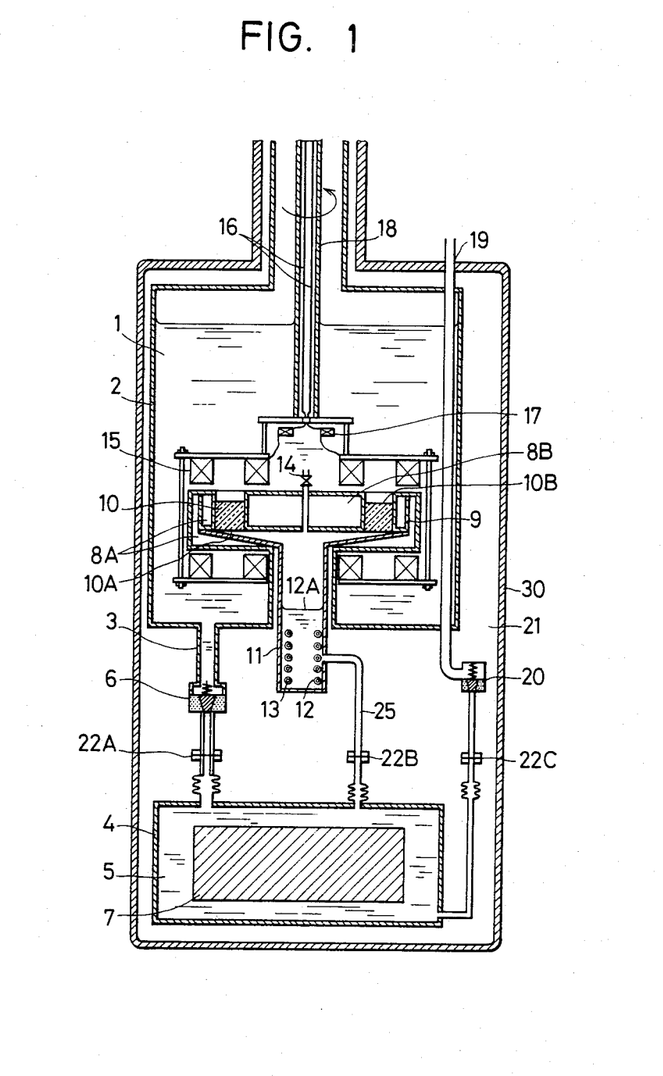
FIG. 1 is a section through one embodiment of the magnetic refrigerator of the present invention.

A magnetic refrigerator operating in the vicinity of the temperature range of liquid helium will be described hereunder as one example of the magnetic refrigerator of the present invention, with reference to FIG. 1. Ordinary liquid helium 1 (4.2 K., 1 atm), which is used as a refrigerant on the high temperature side, is kept in a vessel 2. Liquid helium 5 is injected into a cooling chamber 4 which communicates with the vessel 2 by a connecting pipe 3. The connecting pipe 3 is provided with a valve 6 acting as a safety valve in normal operation, and which is a clearance seal valve provided with a conical valve plate and a valve seat. In normal operation, this valve 6 can provide a temperature gradient between the liquid helium 1 (4.2 K., 1 atm) and the supperfluid helium 5 (1.8 K., 1 atm) due to the Gorter-Mellink phenomenon, the helium 1 and the helium 5 effectively communicate with each other in pressure terms. The cooling chamber 4 holds a substance 7 which is to be cooled, such as a superconducting coil or an electronic device operating at a cryogenic temperature, etc.

Figure 2:
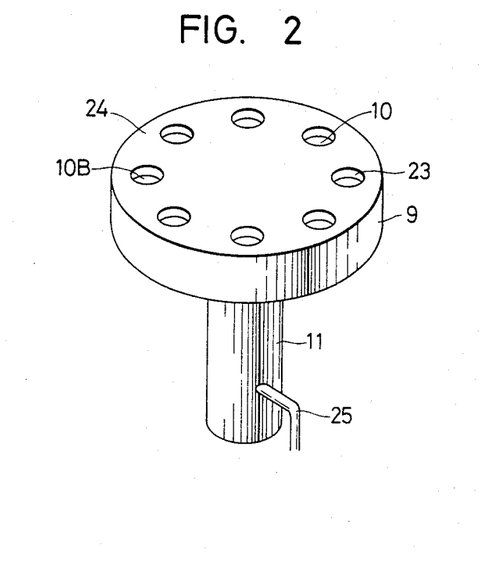
FIG. 2 is a perspective view of a cooling unit thereof.

Working substances 10 are arranged along the inner periphery of a cooling unit 9 provided with heat-insulating vacuum layers 8A and 8B. These working substances 10 are made of a magnetic material such as $Gd_3Ga_5O_{12}$, $Gd_3Al_5O_{12}$ or $Dy_3Al_5O_{12}$. A heat-conducting chamber 11, which forms a thermal switching mechanism on the low temperature side, is provided under lower surfaces 10A of the working substances 10. Saturated liquid helium 12 of a volume about 0.2 to 0.4 times the capacity of the heat-conducting chamber 11 is placed in the chamber, forming a heat pipe. The heat-conducting chamber 11 is formed of a material of a low thermal conductivity, such as stainless steel or ceramic, and the working substances 10 are held firmly in the cooling unit 9 positioned above this chamber, as shown in FIG. 2. 12A in FIG. 1 denotes the level of the saturated liquid helium. The upper surfaces 10B of the working substances 10 are heat-transfer surfaces in contact with the liquid helium 1 which is the refrigerant on the high temperature side of the vessel 2.

A heat exchanger 13 is arranged in such a manner that it is in direct contact with the saturated liquid helium 12, and heat exchange between the saturated liquid helium 12 (1.79 K., about 0.016 atm) and the liquid helium 5 (1.8 K., 1 atm) is performed through a heat-transfer surface of the heat exchanger 13 and a pipe 25. The heat-transfer surfaces of the working substances 10 and the heat exchanger 13 are designed so that the heat-transfer area thereof is substantially increased by fins or the like. The large heat-transfer area thus obtained can reduce the Kapitza resistance in these heat-transfer surfaces substantially.

The heat exchanger 13 in this figure, which is one example of the heat exchangers which can be employed according to the present invention, is prepared by coiling a pipe with closed ends, and placing it in the liquid helium. The saturated liquid helium 12 is introduced into the heat-conducting chamber 11 through a valve 14. The valve 14 is closed in normal operation, so that the quantity of saturated liquid helium 12 is maintained constant. A high magnetic field generator for changing the magnetic entropy of the working substances 10 is constituted by a group of superconducting coils 15 which is immersed in the liquid helium.

Figure 3:
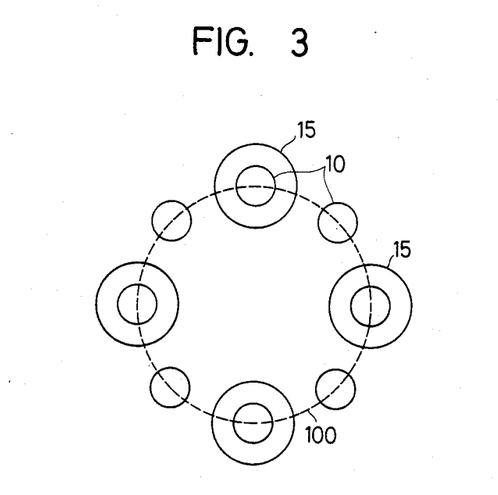
FIG. 3 shows the relationship between the group of coils and the working substances thereof.

The group of superconducting coils 15 is divided into a plurality of pairs which each consists of two coils which can hold the working substances 10 between them from above and below. The group of superconducting coils 15 and the working substances 10 are arranged around the same circle 100 as shown in FIG. 3. The group of superconducting coils 15 is powered by lead wires 16 which are cooled down by the gas evaporated off the liquid helium 1.

Superconductive persistent-current switches 17 are provided, between the lead wires 16 and the group of superconducting coils 15, these are closed in normal operation so that the group of superconducting coils 15 is used in a persistent-current mode. The group of superconducting coils 15 can be rotated by a motor (not shown in the figure) through the intermediary of a rotary shaft 18. Since the working substances 10 are stationary, magnetic fields which each have a magnetic flux density which varies periodically are impressed on the working substances 10 in accordance with the distribution of magnetic fields formed by the group of superconducting coils 15. A pipe 19 is used to supply the liquid helium 1 into the vessel 2, and fill up the liquid helium 5 in the vessel 4, through an initial injection valve 20, so as to pre-cool the substance 7 being cooled. The main components of the magnetic refrigerator described above are enclosed within a heat-insulating vacuum layer region 21 and an outer case 30. Connection flanges 22A, 22B and 22C make it possible to separate the upper components such as the vessel 2 from the part including the vessel 4, and they are sealed with indium wires or the like.

A description will next be made on the principle of the operation of the magnetic refrigerator of the present invention.

Figure 4:
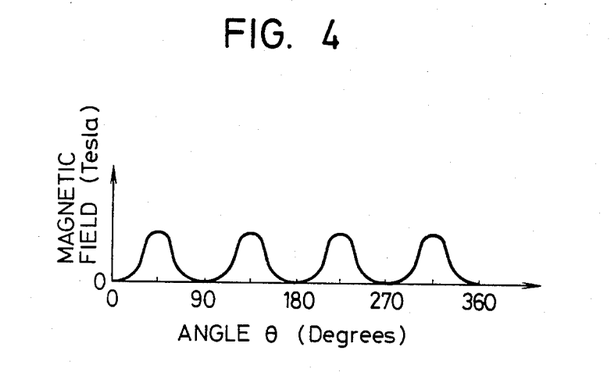
FIGS. 4 to 6 are graphs illustrating the operations of the embodiment of FIG. 1.
Figure 5:
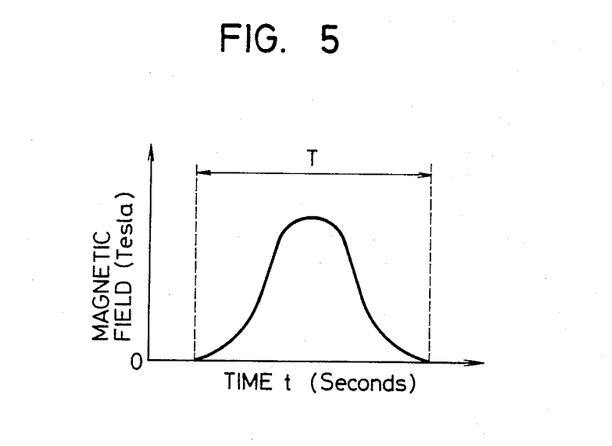

In this embodiment, the magnetic entropy of the working substances 10 is increased and decreased by a method wherein a magnetic flux density applied to the working substances 10 is varied, and heat is exchanged between the working substances and the outside. The magnetic flux density applied to the working substances 10 is varied by rotating the group of superconducting coils 15. During the process, the magnetic flux density applied to the working substances 10 is varied by the distribution of the magnetic flux density formed around the circle of the working substances 10 of the cooling unit 9 by the group of superconducting coils 15, according to their speed of rotation. Assume that eight working substances 10 are arranged at equal intervals around the cooling unit 9, and sets of two paired superconducting coils sandwich the cooling unit 9 from above and below, the group of conducting coils 15 comprising four sets of these pairs of coils arranged at equal intervals. This arrangement distributes magnetic density around the circle of working substances 10 of the cooling unit 9 in such a manner that it varies periodically at an angle $\theta$, as shown in FIG. 4. When the speed of rotation of the group of superconducting coils is denoted by v (rpm), the change in magnetic density applied to each working substance 10 is as shown in FIG. 5. The speed of rotation v is selected so that a cycle T (seconds) takes 1–10 seconds. The maximum magnetic density is set preferably within the range of 2.0 to 4.0 Teslas, according to the type of working substances employed.

Figure 6:
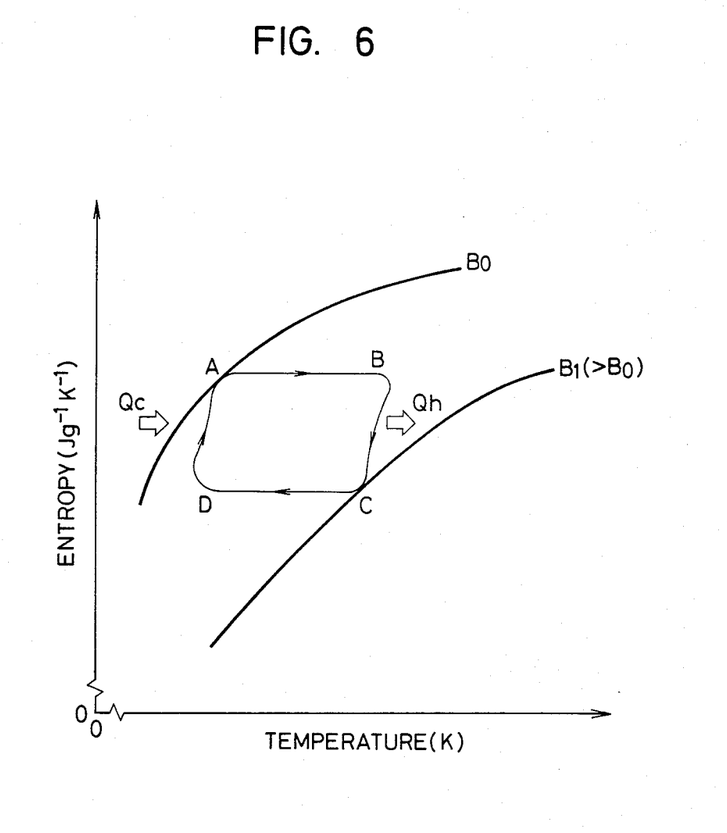

The magnetic refrigerator of the present invention operates in a reverse Carnot cycle, this refrigeration cycle is illustrated in FIG. 6. Magnetic flux B is first increased adiabatically in a step A–B. The magnetic flux B applied to the working substances 10 is then increased quasiisothermally in step B–C, which reduces the magnetic entropy. The quantity of heat $Q_h$ generated during this time is released by boiling heat transfer between the working substance 10 and the liquid helium 1, each heat-transfer surface of the working substances 10 has been processed to improve the boiling heat transfer characteristics thereof. During the steps A-B-C, the quantity of heat exchanged between the working substances 10 and the liquid helium 5 on the low temperature side is determined substantially by the conduction of helium gas within the heat-exchanging chamber 11. This means that the heat exchange is very poor during this process, and thus the working substances and the liquid helium on the low temperature side are put into a substantially heat-insulated state.

When the magnetic flux is decreased almost adiabatically so that the magnetic entropy is reduced, as described above, the temperature of the working substances 10 decreases. The heat exchange between the liquid helium 1 and the working substances 10 during this process is governed by the conduction of the liquid helium 1. The heat conductivity of liquid helium 1 is extremely low (about $2 \times 10^{-4} \text{Wcm}^{-1} \text{K}.^{-1}$), and thus the interfaces therebetween are substantially insulated. However, the quantity of heat applied to the liquid helium 5, such as the heat generated in the substance 7 being cooled, is transferred into the liquid helium 12 through the heat exchanger 13, and evaporates the liquid helium 12. The helium gas produced by this evaporation is recondensed on the heat transfer surfaces of the working substances 10 (corresponding to the lower surfaces 10A of the working substances 10 in FIG. 1) in a step D—A, and transfers a quantity of heat $Q_c$ to the working substances 10. During this process, the working substances 10 absorb the heat so that their entropy is increased. The working substances 10 and the liquid helium 1 are substantially insulated from each other during this process in the same way as in the step C—D.

The refrigeration is performed by repeating periodically the cycle A—B—C—D—A described above.

It is preferable to use $Gd_3Ga_5O_{12}$, for instance, as the working substance, because it has such excellent characteristics, it causes a large change in entropy within the temperature range of 1.8 K. to 4.2 K. by the effect of the magnetic field, and it has an excellent heat conductivity, etc.

Given that the magnetic field on the high-magnetic field side is 4 T (Tesla) and the field on the low-magnetic field side is 0T, the heat transfer efficiency on both the high and low-temperature sides is approximately 100%, and the temperature on the low-temperature side is 1.8 K., $Gd_3Ga_5O_{12}$ when used as the working substance 10 shows a refrigerative ability of about $0.25f$ (W/cm$^3$) per unit volume of working substance, where $f$ is the frequency of the refrigeration cycle.

During this cycle, the liquid helium 12 has a saturation vapor pressure of about 12 mmHg and becomes saturated superfluid helium. The liquid helium 5 becomes superfluid helium under atmospheric pressure, since the pressure thereof is 1 atm through the valve 6.

Figure 7:
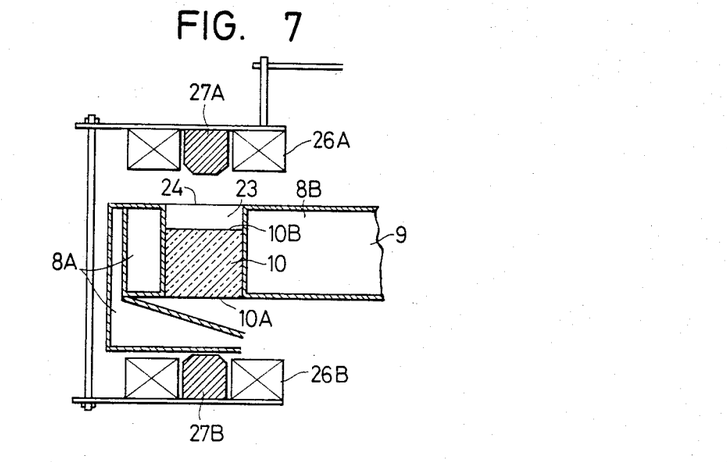
FIG. 7 is a section through a superconducting coil pair.

A detailed description will now be made of the cooling unit 9, with reference to FIGS. 2 and 7. In this unit, a plurality of working substances 10 are embedded in holes 23 arranged around the circumference of the unit. A difference in level is provided between an upper surface 24 of the cooling unit 9 and the upper surfaces 10B of the working substances 10, this can reduce the heat loss caused by the convection of the liquid helium 1 in the cooling steps of B—C—D. Heat loss due to the convection in the gaseous helium in the heat-transferring steps of A—B—C can also be reduced by providing a difference in level at the lower surfaces 10A in the same way. In FIG. 2, piping 25 is provided to connect the liquid helium in the heat exchanger 13 and the vessel 4. A number of small fins may be provided on the upper and lower surfaces of the working substances 10 to increase the quantity of heat transferred. The dimensions of the fins are preferably about 0.1 to 1.0 mm wide and 0.2 to 2.0 mm deep.

The following is a description of a method wherein a magnetic field is impressed efficiently on the working substances 10 by the group of superconducting coils. In FIG. 7, superconducting coils 26A and 26B form a pair of magnets (Helmholtz coils) which sandwich the working substances 10 from above and below. Ferromagnetic bodies 27A and 27B made of iron or the like are provided on the inner-diameter sides of the superconducting coils 26A and 26B, respectively. These ferromagnetic bodies 27A and 27B are devised so that the cross-sectional area of the end surfaces thereof on the working substance side is small so that they focus the magnetic flux. The expansion of the magnetic flux between the superconducting coils 26A and 26B can be reduced thereby, and thus the magnetic field can be impressed efficiently on the working substances 10. The number of pairs of superconducting coils 26A and 26B is usually made smaller than that of the working substances 10.

The foregoing description concerns an apparatus operating between 1.8 K. and 4.2 K. It is obvious that the apparatus can operate within different temperature ranges, if an appropriate refrigerant is selected for those ranges.

Figure 8:
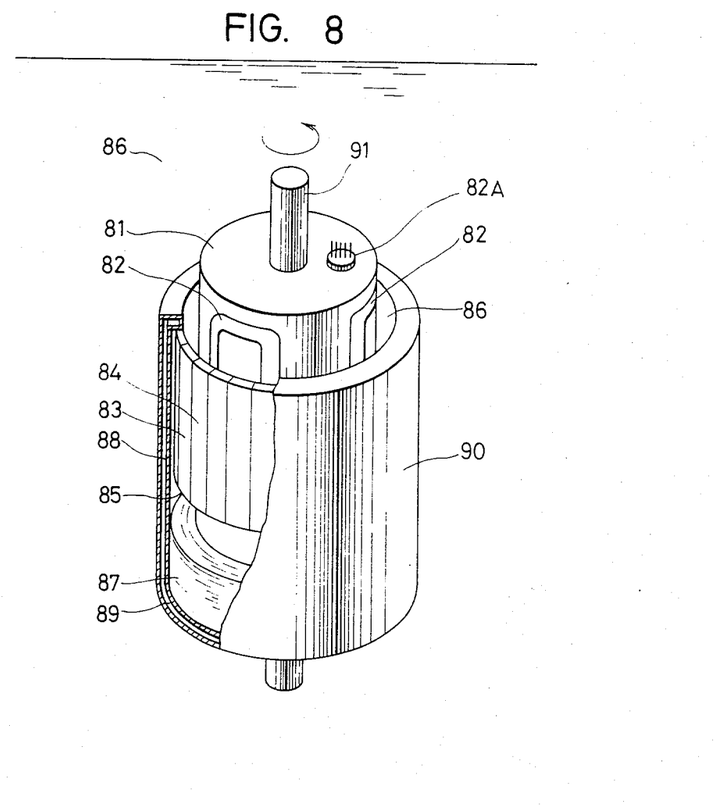
FIG. 8 is a perspective view of another embodiment of the magnetic refrigerator of the present invention.
Figure 9:
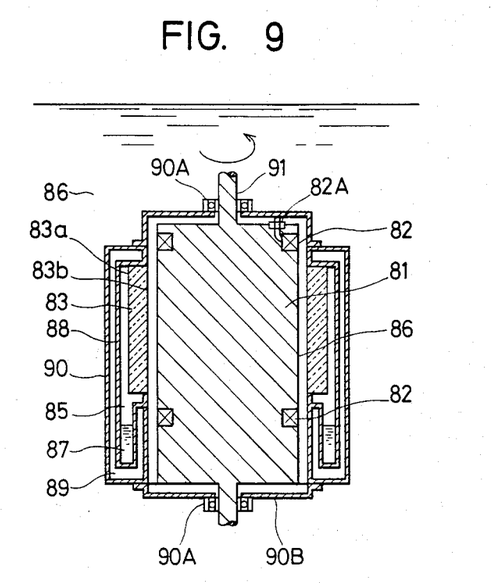
FIG. 9 is a section through the magnetic refrigerator of FIG. 8.

Another embodiment of the present invention will be described hereunder with reference to FIGS. 8 and 9. A plurality of superconducting coils 82 are arranged on the outer peripheral surface of a solid or hollow cylindrical rotor 81. An initial prescribed current is made to flow through these superconducting coils through a removable power lead 82A. A predetermined distribution of magnetic fields is formed over the outer peripheral surface of the rotor by the superconducting coils thereof. This distribution of magnetic fields is such that the magnitude of the magnetic fields increases and decreases periodically around the outer peripheral surface. Magnetic elements formed of gadnium-gallium-garnet ($Gd_3Ga_5O_{12}$) or the like, which act as a plurality of working substances 83 for magnetic refrigeration, are arranged within the distribution of these magnetic fields. Heat-separating parts 84 formed of a material with a small heat conductivity are arranged between individual working substances. Heat transfer surfaces 83a on the low-temperature side of the magnetic bodies and heat transfer surfaces 83b thereof on the high-temperature side are in direct contact with saturated helium gas 85 (at about 12 mmHg) liquid helium 86 (about 1 atm, 4.2 K.), respectively. Saturated superfluid helium 87 (about 12 mmHg, 1.8 K.) is provided below the helium gas. The helium gas 85 and the superfluid helium 87 are contained in a vessel 88, are sealed hermetically by the working substances 83, the heat-separating parts 84 and the vessel 88, and are separated from the liquid helium 86 in pressure terms. The gap between the working substances 83 and the vessel 88 is made to be as small as approximately 0.1 to 1.0 mm so that no convection occurs. A 1.8 K. layer is insulated by an insulating vacuum layer 89. Numeral 90 denotes an insulating vacuum vessel, 90A a ball bearing, and 90B a hole for pouring in the liquid helium 86. The insulating vacuum vessel 90 containing the magnetic elements 83 is always-stationary, and the rotor 81 can be rotated by a shaft 91. When the rotor 81 is rotated, a magnetic field is applied to and removed from the working substances 83 periodically in accordance with the distribution of magnetic fields formed by the superconducting coils 82, and with the rotational variation of the rotor 81. Namely, when a magnetic field is impressed on the working substances, the temperature of the working substances 83 rises, and the heat thereof is released into the liquid helium 86 from the heat transfer surfaces 83b on the high-temperature side thereof. When the working substances 83 are demagnetized, the temperature thereof drops, and the helium gas 85 is condensed on the heat transfer surfaces 83a on the low-temperature side of the working substances 83. A refrigeration cycle between the temperatures of 1.8 K. and 4.2 K. can be formed by repeating periodically the heat exchange between the working substances and the outside in this way.

Convection is prevented so that no heat transfer occurs between the working substances 83 and the liquid helium 86 by the natural convection of the liquid helium 86 acting as the high-temperature refrigerant, when the temperature of the working substances 83 is lower than that of the liquid helium 86. In addition, heat transfer by the natural convection of the helium gas 85 is prevented so that no heat exchange occurs between the helium gas 85 and the working substances 83 when the temperature of the working substances 83 is higher than 1.8 K.

Figure 10:
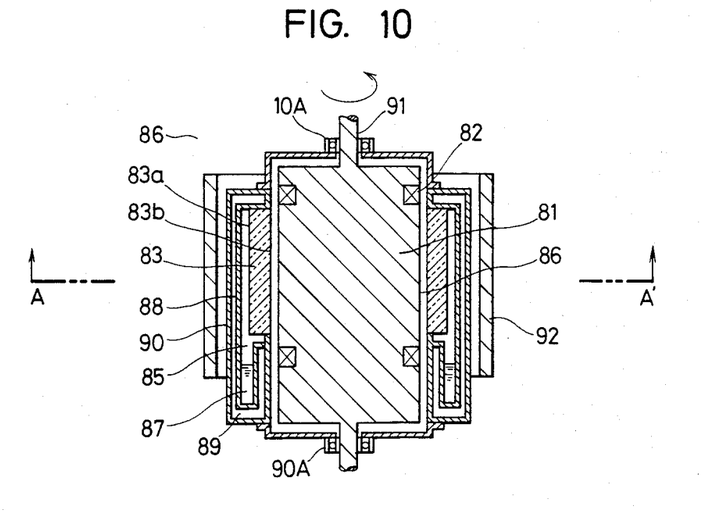
FIGS. 10 to 13 each show sections through other embodiments of the present invention.
Figure 11:
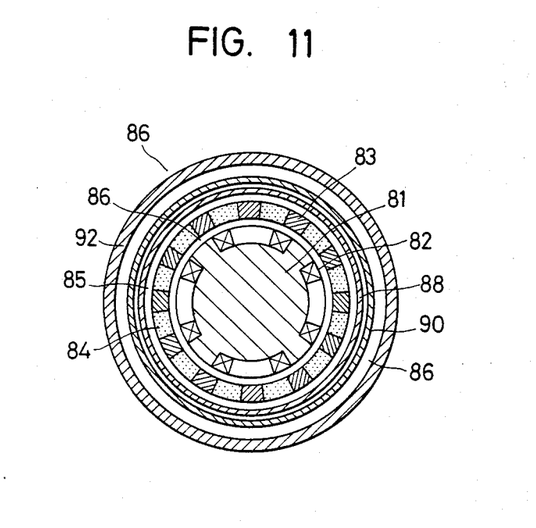

The magnetic field impressed on the plurality of working substances 83, which are arranged around the outer periphery of the rotor 81, varies from high to low to high and low again . . . around the circumference thereof by the magnetic fields generated by the plurality of superconducting coils. In order to make this variation of the magnetic field effective, a hollow cylinder 92 formed of a material with a high permeability, such as iron, may be provided around the outer periphery of the working substances 83 to focus the magnetic circuit, as shown in FIGS. 10 and 11.

Figure 12:
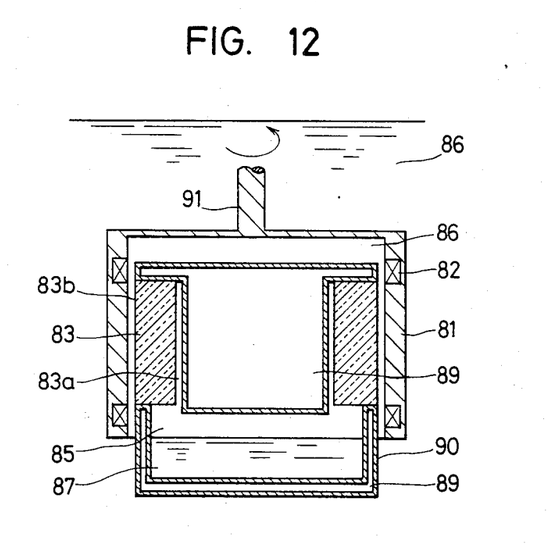

In one method of applying a periodic field variation to the working substances 83, the substances can be arranged within the rotor 81 of a hollow cylindrical body, as shown in FIG. 12.

Figure 13:
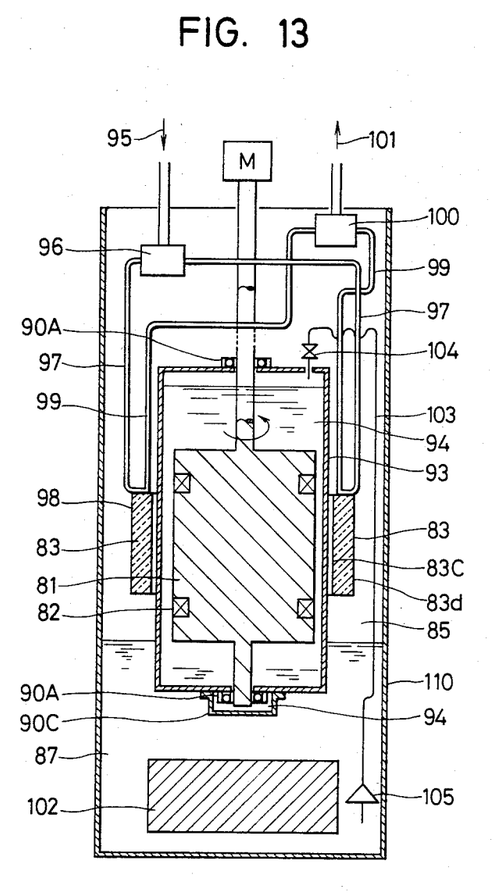

The above description concerns a refrigeration cycle within the range of 1.8 K. to 4.2 K. When helium is used as the refrigerant, the low-temperature side can be set within a region wherein the temperature is lower than the critical point of 5.2 K. It can be set within a higher-temperature region when hydrogen, argon, nitrogen or another gas is used as the refrigerant. For the high-temperature side, it is sufficient to set a higher temperature than the temperature set on the low-temperature side, and it is unnecessary to limit the refrigerant on the high-temperature side to a liquid, if some appropriate thermal switch mechanism is provided on this side. FIG. 13 shows one embodiment of the present invention wherein the temperature ranges from 4.2 K. on the low-temperature side to 20 K. on the high-temperature side. When the rotor 81 is rotated in accordance with the distribution of magnetic fields generated by the superconducting coils 82 incorporated in the rotor 81, magnetic fields impressed on a plurality of working substances 83 arranged around the periphery thereof increase and decrease in the same way as in the previous examples. 90C denotes a bottom cover, and 110 an outer vessel. The rotor 81 is immersed in liquid helium 94 within a vessel 93. When the working substances 83 are magnetized, helium gas 95 at 20 K. generated by a helium gas refrigerator (not shown) enters a channel selector valve box 96 and, after absorbing the heat generated in the working substances 83 on heat-exchanging surfaces 98 on the high-temperature side of the working substances 83 through a pipe 97, returns through a pipe 99 and enters another channel selector valve box 100, and helium gas 101 therefrom returns to a helium gas refrigerator on the outside. Since the temperature of the working substances drops below 4.2 K. when they are demagnetized, the helium gas 95 is condensed and liquefied on heat transfer surfaces 83c and 83d on the low-temperature side of the working substances 83. A heat load, such as the heat loss by a substance 102 being cooled and by the rotations of the rotor 81 and a pump 105 supplying liquid helium 94 through a pipe 103 and a valve 104, is absorbed by the recondensation of the evaporated helium gas. It is apparent from the above description that the rotor 81 is not necessarily immersed in the liquid helium, that superconducting coils can be force-cooled by the helium gas, and that ordinary conducting coils provided at an ordinary temperature can also be employed.

According to the present invention, a magnetic refrigerator of a high efficiency and a high reliability can be obtained, since working substances can be magnetized and demagnetized periodically by rotating a rotor provided with a plurality of superconducting coils thereon, while said working substances are kept stationary.

What is claimed is:

1. In a magnetic refrigerator which is provided with a plurality of magnetic refrigeration working substances which generate heat when magnetized and absorb heat when demagnetized, a magnetic field generating device which magnetizes and demagnetizes said working substances periodically, a heat-releasing mechanism which releases heat to a high-temperature side when said working substances are magnetized, and a heat-absorbing mechanism which absorbs heat from a low-temperature side when said working substances are demagnetized, and in which said working substances operate in a stationary state, a magnetic refrigerator characterized by the provision of a rotor with a plurality of coils arranged around the circumference thereof and a means for driving said rotor, wherein a plurality of said working substances are arranged around the outer or inner periphery of said rotor, a current flows through said coils so as to form a distribution of magnetic fields around the periphery of said rotor such that the strength of said magnetic fields is increased and decreased, and said rotor is rotated to magnetize and demagnetize said working substances periodically.

2. The magnetic refrigerator according to claim 1, characterized in that said coils are superconducting coils, said rotor is provided in a vessel containing liquid helium, and said vessel is housed in an outer case provided with a heat-insulating vacuum layer portion.

3. The magnetic refrigerator according to claim 1, characterized in that said coils are superconducting coils, said rotor is provided in a vessel containing liquid helium, and said vessel is housed in an outer case containing helium.

4. The magnetic refrigerator according to claim 3, characterized in that said superconducting coils are provided around the outer periphery of said rotor, said working substances are arranged on the outside of said rotor, and heat-separating bodies are provided between individual working substances.

* * * * *